United States Patent
Lyon et al.

(10) Patent No.: US 9,507,019 B1
(45) Date of Patent: Nov. 29, 2016

(54) METHOD FOR ACQUIRING AND TRACKING AN IN-FLIGHT TARGET

(71) Applicant: L-3 Communications Corp., New York, NY (US)

(72) Inventors: Scott M. Lyon, South Weber, UT (US); Jonathan R. Lawton, Provo, UT (US); Joshua R. Warr, South Jordan, UT (US); Richard A. Vester, Olathe, KS (US)

(73) Assignee: L-3 Communications Corp., New York, NY (US)

( * ) Notice: Subject to any disclaimer, the term of this patent is extended or adjusted under 35 U.S.C. 154(b) by 896 days.

(21) Appl. No.: 13/865,929

(22) Filed: Apr. 18, 2013

Related U.S. Application Data

(60) Provisional application No. 61/636,476, filed on Apr. 20, 2012.

(51) Int. Cl.
  G01S 5/02  (2010.01)
  G01S 13/72 (2006.01)

(52) U.S. Cl.
  CPC .................................... G01S 13/72 (2013.01)

(58) Field of Classification Search
  CPC ........... G01S 5/02; G01S 13/72; H01Q 3/00; H01Q 3/02; H01Q 1/125; H01Q 1/1257; H01Q 1/32
  USPC ........................................................ 342/428
  See application file for complete search history.

(56) References Cited

U.S. PATENT DOCUMENTS

| | | | |
|---|---|---|---|
| 3,646,565 A | 2/1972 | Robinson | |
| 4,574,289 A | 3/1986 | Henderson | |
| 6,556,174 B1 | 4/2003 | Hamman et al. | |
| 7,356,390 B2 * | 4/2008 | Knoblach | B64B 1/40 244/31 |
| 7,446,721 B2 * | 11/2008 | Eom | G01S 3/42 343/757 |
| 8,427,384 B2 * | 4/2013 | Clymer | H01Q 1/185 343/753 |
| 8,896,483 B2 * | 11/2014 | Markin | G01S 3/08 342/149 |

OTHER PUBLICATIONS

Robert Dolp, Winfried Mayer, Wilfried Grabherr; Industrialization of a 58 GHz High Gain Flat Panel Antenna Design using Injection Molding Technique, 29th European Microwave Conference, 1999, pp. 13-15, vol. 3, Munich.

Eduardo B. Lima, Jorge R. Costa, Carlos A. Fernandes; Mechanical Beam-Steerable Elliptical Dome Lens, 3rd European Conference on Antennas and Propagation, 2009, pp. 1814-1818.

* cited by examiner

*Primary Examiner* — Harry Liu
(74) *Attorney, Agent, or Firm* — Workman Nydegger

(57) ABSTRACT

A method for acquiring and tracking an in-flight or airborne target using an antenna is provided. In the acquisition process, the antenna is rotated to collect RF power data. The location of peak RF power is determined and the antenna is pointed to that location. The antenna may then undergo a search pattern on either side of that location to detect a specified drop in RF power and a modem on which to lock. In the tracking process, an algorithm allows the antenna to track the target in a pure RF mode, a GPS-based open loop pointing mode or a hybrid mode. The tracking may automatically switch between the pure RF mode and the hybrid mode, depending upon whether GPS data is available from the target.

11 Claims, 2 Drawing Sheets

METHOD FOR ACQUIRING AND TRACKING AN IN-FLIGHT TARGET

CROSS-REFERENCE TO RELATED APPLICATIONS

This Application claims priority to U.S. Provisional Application Ser. No. 61/636,476, filed Apr. 20, 2012 to Rory K. Sorensen, et al. entitled "Directional Single-Axis Antenna Assembly and Method," the entire disclosure of which is incorporated herein by reference.

BACKGROUND OF THE INVENTION

It is often necessary to track the location of an aircraft or other object in flight. This tracking may occur through use of a portable tracking system in a remote locale operated by a user who may not have undergone extensive training on using the tracking system. These tracking systems may utilize a directional antenna that transmits and receives a radio frequency signal in tracking the target. In other cases, open loop pointing techniques can be very effective for tracking a target if GPS location data is available for both the target and the antenna. However, such GPS is not available in some situations and is only intermittently available in other situations.

As such, a need exists for a tracking method that does not require a user to find north or boresight the antenna used in the tracking operation and allows the antenna to be setup and employed with minimal intervention, knowledge and training. A need also exists for a method capable of providing automated target acquisition. A further need exists for a method capable of providing the ability to switch between a pure radio frequency tracking mode and a hybrid tracking mode utilizing both radio frequency tracking and GPS-based open loop pointing, depending upon whether GPS data from the target is available.

BRIEF SUMMARY OF THE INVENTION

The present invention involves the provision of a method for acquiring and tracking an in-flight or airborne target. The method is designed to utilize the best possible combination of data available when tracking a target in an automatic mode of operation. The algorithm associated with the method may allow the antenna to track the target in one of three modes, including (1) a pure radio frequency tracking mode, (2) a Global-Positioning System-based open loop pointing mode, and (3) a hybrid mode utilizing both radio frequency tracking and Global-Positioning System-based open loop pointing.

In one embodiment, the method includes the steps of: providing an antenna including a horn rotatably mounted to a base, performing a first search by rotating the horn in azimuth to collect power data, determining the location of a peak power level, pointing the antenna to the location of the peak power level and tracking the position of a target located at the peak power level. Additional scans or searches may be performed at slower speeds and in different rotational directions if the target is not acquired in the initial search.

Once the target is acquired, an algorithm may be utilized for automatically switching between the pure radio frequency tracking mode and the hybrid mode, depending upon whether GPS data is available for the target. In doing so, the algorithm determines whether a specified period of time has lapsed since the antenna last received GPS data from the target. If the specified period of time has not lapsed, the antenna will continue to track the target in the hybrid mode. However, if the specified period of time has lapsed without the antenna receiving GPS data from the target, the antenna will switch back to tracking the target in pure radio frequency mode. If this occurs, hybrid mode may resume upon the antenna receiving of GPS data from the target again.

North may be determined from the tracking capability of the antenna. In one embodiment, north may be determined by comparing where an antenna-to-target line of sight (LOS) vector is pointed with where a gimbal is pointed. The LOS vector is determined in a local level coordinate frame and the vector is defined in a North, East Down coordinate system. Once the target is found, the actual pointing angle from the antenna can be read and compared to the LOS vector. Since the algorithm knows the required angle from true North and the algorithm can read the position of the resolver, the antenna is now capable of estimating the angle of the resolvers that is associated with true North.

Other and further objects of the invention, together with the features of novelty appurtenant thereto, will appear in the course of the following description.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

Figure 1:
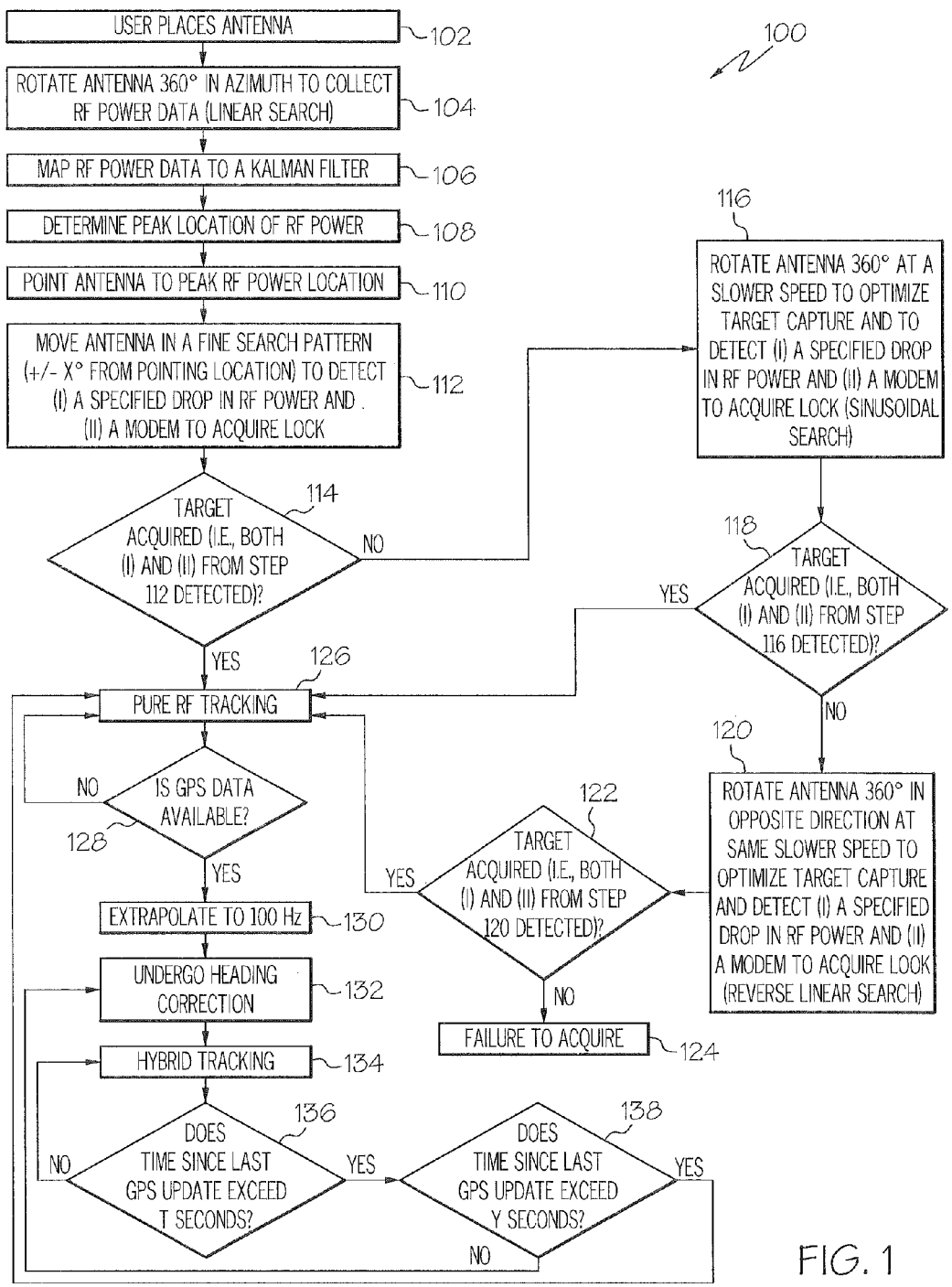
FIG. 1 is a block flowchart diagram of a method for acquiring and tracking a target in accordance with one embodiment of the present invention.

The invention will now be described with reference to the drawing figures. The methods of the present invention will be described in a series of steps, not all of which may be required to suitably perform the methods of the present invention. In referring to the figures, the reference numbers included therein will be referred to interchangeably as "steps" or "blocks."

The method for acquiring and tracking an in-flight or airborne target of the present invention involves an improved method that allows users, such as military personnel, to quickly and simply setup and employ an antenna with minimal intervention, knowledge and training. The method may be performed using any suitable antenna, including but not limited to the antenna disclosed in U.S. application Ser. No. 13/865,893, entitled "Directional Single-Axis Horn-Reflector Antenna" to Harker, et al., the entire disclosure of which, including the specification and drawings, is incorporated herein by reference. The target may include any one of a large variety of aircraft, including manned and unmanned aerial vehicles (UAVs), and other objects of various sizes and traveling at various speeds in flight or orbit. Additionally, the method is designed to utilize the best possible combination of data available when tracking a target in an automatic mode of operation, as will be described in further detail below.

The algorithm associated with the antenna and method may allow the antenna to track in one of three modes, including (1) a pure radio frequency (RF) tracking mode, (2)

a Global-Positioning System-based (GPS-based) open loop pointing mode, and (3) a hybrid mode utilizing both RF tracking and GPS-based open loop pointing. The antenna typically operates in either the pure RF tracking mode or the hybrid mode, depending upon whether the antenna is receiving GPS data from the target.

Turning now to FIG. 1, a flowchart illustrating one embodiment of the present invention is provided. The method 100 for acquiring and tracking an in-flight target begins with a user placing an antenna in a desired location, as indicated at block 102. In a preferred embodiment, the user is not required to boresight the antenna to determine north or line the antenna up with north. Rather, the antenna can simply be set down, turned on, and instructed to acquire the target.

The method 100 shown in FIG. 1 includes an acquisition process (described in blocks 102 through 124) and a tracking process (described in blocks 126 through 138). The acquisition process of the present invention can include a two-stage approach in acquiring a target. As described in greater detail below, the first stage (described in blocks 104 through 110) involves finding the location of peak RF power and pointing the antenna at that location and the second stage (described in blocks 112 through 124) involves acquiring and locking in on the target.

The first stage of the acquisition process involves a 360° scan and mapping of the RF power levels. At block 104, the antenna is rotated 360° in azimuth at a first speed, undergoing a search to collect RF power data. The collected RF power data may then optionally be mapped to a Kalman filter, as shown at block 106. The collected RF power data used to determine the location of peak RF power in step 108. Once the 360° scan is complete and the location of peak RF power is determined, the antenna points to the general location of peak RF power in block 110 and begins the second stage of the acquisition process.

The second stage of the acquisition process involves sweeping the antenna in a fine, sinusoidal search pattern in a specified number of degrees)(+/−X°) on either side of the peak location to detect (i) a specified drop in RF power from a peak and (ii) a modem to acquire lock, as indicated at block 112. This may begin with a small slow sweep of a specified tolerance around the pointing direction based on parameters dictated by the user or set forth in the algorithm. During this slow sweep, the antenna will look for a drop in RF power that can be defined by a configuration file.

In step 114, it is determined whether or not the target was acquired. In doing so, it is determined whether both (i) a specified drop in RF power and (ii) a modem to acquire lock were detected in step 112. If the target was acquired, the antenna will move back to the highest power level and begin a pure RF tracking, as shown at block 126 and discussed in greater detail below. If the target was not acquired, the antenna may be rotated 360° at a slower speed than the first speed of the initial scan (at block 104) in order to optimize target capture and detect (i) a specified drop in RF power and (ii) a modem to acquire lock. During this scan, the antenna is looking for the same drop in RF power level, thereby making the antenna less susceptible to multiple RF sources that may be in the area. The scan at step 116 may be a linear search.

Upon the completion of the second scan at block 116, if such scan is necessary, it is determined whether or not the target was acquired in step 118. This step is similar to step 114. Thus, in step 118, it is determined whether both (i) a specified drop in RF power and (ii) a modem to, acquire lock were detected in step 116. If the target was acquired, the antenna will move back to the highest power level and begin a pure RF tracking, as shown at block 126 and discussed in greater detail below. If the target was not acquired, the antenna can be rotated 360° in the opposite direction at the same slower speed in order to optimize target capture and detect (i) a specified drop in RF power and (ii) a modem to acquire lock. This scan may be a reverse linear search.

Upon the completion of the third scan at block 120, if such scan is necessary, it is determined whether or not the target was acquired in step 122. If the target was acquired, the antenna will move back to the highest power level and begin a pure RF tracking, as shown at block 126 and discussed in greater detail below. If the target was not acquired, the antenna may provide a signal or message to the user informing the user of the same. At that point, the user may decide to relocate the antenna to a new location (block 102) or restart the acquisition process at the antenna's current location.

Once the target is acquired, whether through step 114, step 116 or step 120, the antenna begins pure RF tracking in step 126. As set forth above, the antenna may be set to one of three tracking modes, including (1) a pure RF tracking mode, (2) a GPS-based open loop pointing mode, or a (3) a hybrid mode. If the antenna is set to a pure RF tracking mode, the antenna will continue to track the target through pure RF tracking in step 126. The antenna's method of RF tracking may utilize two types of control methodologies, including (1) received signal strength indicator (RSSI) and (2) signal-to-noise ratio (SNR). RSSI generally won't be suitable if the target is too far away from the antenna and SNR generally won't be suitable if the target is too close to the antenna. Thus, in order to achieve a full dynamic range, both the RSSI and SNR signals are used. In one embodiment, once the RF tracking scheme is initialized, the antenna will begin to move in a sinusoidal pattern and the RF power (a combination of RSSI and SNR) is then mapped to the sinusoidal pattern using a Kalman filter. As the data is mapped, updates are continuously available to the antenna with corrections in the pointing direction. The Kalman filter along with the sinusoidal pattern in azimuth makes it possible to achieve the desired tracking speeds required by this design.

If the antenna is set to GPS-based open loop pointing mode, the antenna will determine whether GPS data is available and, if so, track the target using that data.

If the antenna is set to hybrid mode, the antenna will determine whether GPS data is available in step 128 and, if so, track the target using pure RF tracking and GPS-based open loop pointing. In step 128, it is determined whether or not GPS data is available for the target and the ground-based antenna. If GPS data is not available, the antenna will continue tracking the target through the pure RF tracking approach in block 126. If GPS data is available, the antenna will automatically transition into a hybrid tracking approach. In doing so, the antenna may extrapolate the data to a higher rate (e.g., 100 Hz or other suitable rate) in step 130 and undergo a one-time correction heading in step 132.

In hybrid tracking mode, the antenna uses the GPS data from the target along with the antenna's UPS position, which may be acquired by the user with a handheld UPS device or otherwise, to create a local vector. With that vector, the algorithm can compare where the antenna-to-target line of sight vector is pointed and where the gimbal is pointed in order to determine where north is located. Thus, north can be determined from the tracking capability of the antenna.

The transition between pure RF tracking mode and hybrid tracking mode is designed to be automatic and based on whether GPS data is available. The user may choose between manual and automatic settings. When in the automatic setting, the antenna will switch to the more optimal mode. The algorithm allows the antenna to automatically switch between pure RF tracking mode and hybrid tracking mode, based on whether or not the antenna is receiving GPS data from the target. Thus, if the target stops sending GPS data to the antenna or if there is a communication fault with the GPS data somewhere in the system, the antenna will stop the GPS-based open loop pointing aspect of the hybrid tracking and automatically switch to the pure RF tracking mode. If GPS data begins again, the algorithm will recalculate north and then begin the GPS-based open loop pointing on top of the RF tracking in the hybrid mode. The algorithm can include a prediction feature that prevents the antenna from jumping from hybrid mode to pure RF tracking mode, and vice versa, too quickly for short outages of GPS data.

Steps 136 and 138 determine whether or not the antenna should remain in hybrid tracking mode or switch to pure RF tracking mode. In step 136, it is determined whether a specified amount of time (T) has passed since the last GPS update was received from the target. If that specified amount of time (T) has not yet passed, the antenna remains in hybrid tracking mode, as shown at block 134. If that specified amount of time (T) has passed, it is determined whether a longer specified amount of time (Y) has passed in step 138. If that longer specified amount of time (Y) has not yet passed, the antenna undergoes a heading correction at block 132 and continues to track in hybrid tracking mode at block 134. If that longer specified amount of time (Y) has passed, the antenna switches to pure RF tracking mode at block 126. If this occurs, the algorithm may be such that the antenna will continue searching for GPS data from the target, and if GPS data resumes, the antenna may reinstitute the hybrid tracking mode.

Figure 2:
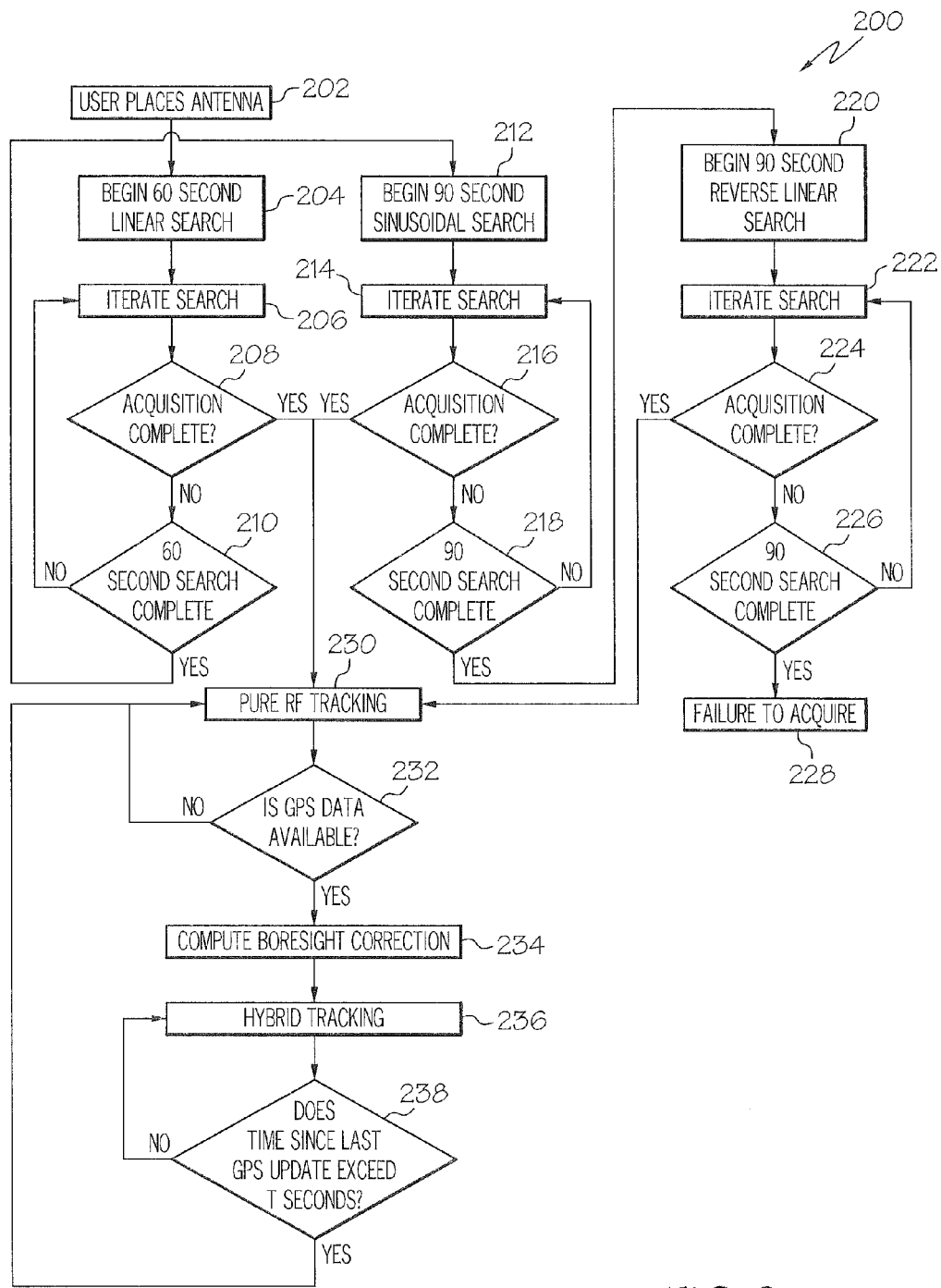
FIG. 2 is a block flowchart diagram of a method for acquiring and tracking a target in accordance with another embodiment of the present invention.

Turning now to FIG. 2, a flowchart illustrating another embodiment of the present invention is provided. The method 200 for acquiring and tracking an in-flight target begins with a user placing an antenna in a desired location, as indicated at block 202. In a preferred embodiment, the user is not required to boresight the antenna to determine north or line the antenna up with north. Rather, the antenna can simply be set down, turned on, and instructed to acquire the target. The method 200 shown in FIG. 2 includes an acquisition process (described in blocks 202 through 228) and a tracking process (described in blocks 230 through 240). Like the embodiment of method 100 described above, method 200 may include three separate scanning opportunities, at blocks 204, 212 and 220, for acquiring the target.

In step 204, the antenna undergoes a scan, searching for the target. This scan may continue for a specified period of time, for example 60 seconds, and may be a linear or sinusoidal search. The search results are iterated in step 206 and a determination is made whether or not the target was acquired in step 208. If the target was acquired, the antenna will begin a pure RF tracking, as shown at block 230. If the target was not acquired, step 210 determines whether the specified period of time for the search, for example 60 seconds, is complete. If the search 204 is not complete, the antenna will continue to search and iterate the search results. If the search 204 is complete, but no target has been acquired, a second search is initiated in step 212.

The second search in step 212 may occur over a longer specified period of time, for example 90 seconds. This search may be a sinusoidal or linear search. The same general process is followed as was followed during the first search 204. The search results are iterated in step 214 and a determination is made whether or not the target was acquired in step 216. If the target was acquired, the antenna will begin a pure RF tracking, as shown at block 230. If the target was not acquired, step 218 determines whether the specified period of time for the second search, for example 90 seconds, is complete. If the second search 212 is not complete, the antenna will continue to search and iterate the search results. If the second search 212 is complete, but no target has been acquired, a third search is initiated in step 220.

The third search in step 220 may occur over the same longer specified period of time, for example 90 seconds. This search may be a reverse linear search, as the antenna may rotate in a direction opposite to that in the first search 204 and second search 212. The same general process is followed as was followed during the first and second searches 204 and 212. The search results are iterated in step 222 and a determination is made whether or not the target was acquired in step 224. If the target was acquired, the antenna will begin a pure RF tracking, as shown at block 230. If the target was not acquired, step 226 determines whether the specified period of time for the third search, for example 90 seconds, is complete. If the third search 220 is not complete, the antenna will continue to search and iterate the search results. If the third search 220 is complete, but no target has been acquired, the antenna may provide a signal or message to the user informing the user that no target was acquired. At that point, the user may decide to relocate the antenna to a new location (block 202) or restart the acquisition process at the antenna's current location.

Once the target is acquired, whether through step 204, step 212 or step 220, the antenna begins pure RF tracking in step 230. This pure RF tracking may be similar to the pure RF tracking described with respect to step 126 of the embodiment of the method 100 illustrated in FIG. 1.

Again, the antenna may be set to one of three tracking modes, including (1) a pure RF tracking mode, (2) a GPS-based open loop pointing mode, or a (3) a hybrid mode. If the antenna is set to a pure RF tracking mode, the antenna will continue to track the target through pure RF tracking in step 230.

If the antenna is set to GPS-based open loop pointing mode, the antenna will determine whether GPS data is available and, if so, track the target using that data.

If the antenna is set to hybrid mode, the antenna will determine whether GPS data is available in step 232 and, if so, track the target using that pure RF tracking and GPS-based open loop pointing. In step 232, it is determined whether or not GPS data is available for the target and the ground-based antenna. If GPS data is not available, the antenna will continue tracking the target through pure RF tracking approach in block 230. If GPS data is available, the antenna will automatically transition into a hybrid tracking approach. In doing so, the antenna may compute a boresight correction in step 234.

The transition between pure RF tracking mode and hybrid tracking mode is designed to be automatic based on whether the GPS data is available. The user may choose between manual and automatic settings. When in the automatic setting, the antenna will switch to the more optimal mode. The algorithm allows the antenna to automatically switch between pure RF tracking mode and hybrid tracking mode, based on whether or not the antenna is receiving UPS data from the target. Thus, if the target stops sending GPS data to the antenna or if there is a communication fault with the GPS data somewhere in the system, the antenna will stop the GPS-based open loop pointing aspect of the hybrid tracking and automatically switch to pure RF tracking mode. If GPS data begins again, the algorithm will recalculate north and then begin the GPS-based open loop pointing on top of the RF tracking in the hybrid mode. The algorithm can include a prediction feature that prevents the antenna from jumping from hybrid mode to pure RF tracking mode, and vice versa, too quickly for short outages of GPS data.

Step 238 determines whether or not the antenna should remain in hybrid tracking mode or switch to pure RF tracking mode. In step 238, it is determined whether a specified amount of time (T) has passed since the last GPS update was received from the target. If that specified amount of time (T) has not yet passed, the antenna remains in hybrid tracking mode, as shown at block 236. If that specified amount of time (T) has passed, will revert to pure RF tracking.

It will be appreciated that, in one embodiment, the method of the present invention may be run from a mobile application. In this embodiment of the method, the stationary behavior required for the operation of the tracking algorithm would be adapted to utilize a gyroscope or Inertial Measurement Unit (IMU) to create an initial reference frame such that the antenna may be mobile. In this embodiment, the antenna would utilize the inertial reference frame as a pseudo stationary reference plane and then the same tracking algorithms as applied above can be used in a non-stationary environment. In this embodiment, the antenna would constantly be utilized to remove the drift rate of the gyroscope and/or Inertial Measurement Unit.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for acquiring and tracking a target, said method comprising the steps of:
providing an antenna including a horn rotatably mounted to a base;
RF received power data at said antenna from a received RF signal;
determining a location of an RF received peak power level;
rotating said horn to point to said location of RF received peak power level; and
tracking the position of a target located at said location of RF received peak power level,
wherein said tracking step may utilize at least one of (a) a pure RF tracking mode, (b) a GPS-based open loop pointing mode and (c) a hybrid mode utilizing both RF tracking and GPS-based open loop pointing modes,
wherein said tracking step applies an algorithm for automatically switching between two or more of said modes, depending upon the availability of GPS data received from said target.

2. The method of claim 1 further comprising the step of moving said antenna in a search pattern looking for both a specified drop in power and for a modem to acquire a lock.

3. The method of claim 1 further comprising the step of performing a second search by rotating said horn in azimuth at a slower speed than said first speed to collect power data.

4. The method of claim 3 further comprising the step of performing a third search by rotating said horn in azimuth in an opposite direction and at a slower speed than said first speed to collect power data.

5. The method of claim 4, wherein said first search is a linear search, said second search is a sinusoidal search and said third search is a series of reversing linear searches.

6. The method of claim 1 further comprising the step of determining whether a specified period of time has lapsed since said antenna last received GPS data from said target.

7. The method of claim 6 further comprising the step of switching from said hybrid mode to said pure RF tracking mode if said specified period of time has lapsed without said antenna receiving GPS data from said target.

8. The method of claim 1 further comprising the step of comparing where an antenna-to-target line of sight vector is pointed with respect to where a gimbal is pointed to determine where north is located.

9. The method of claim 8, wherein a user is not required to boresight said antenna to determine north or line said antenna up with north.

10. A method for acquiring and tracking a target, said method comprising the steps of:
providing an antenna including a horn rotatably mounted to a base;
performing a first search by rotating said horn in azimuth to collect RF received power data at said antenna from a received RF signal;
determining a location of an RF received peak power level;
rotating said horn to point to said location of RF received peak power level;
moving said antenna in a search pattern looking for both a specified drop in RF received power and for a modem to acquire a lock;
determining if GPS data has been received from said target and is available locally at said antenna;
tracking the position of said target, wherein if said GPS data has not been received from said target or if said GPS data is not available locally at said antenna, tracking said target in a pure RF tracking mode that does not utilize said GPS data, and wherein if said GPS data has been received from said target and is available locally at said antenna, tracking said target in a hybrid mode utilizing both RF tracking and GPS based open loop pointing;

determining whether a specified period of time has lapsed since said antenna last received GPS data from said target; and switching from said hybrid mode to said pure RF tracking mode if said specified period of time has lapsed since said antenna last received GPS data from said target.

11. A method for acquiring and tracking a target, said method comprising the steps of:

providing an antenna including a horn rotatably mounted to a base;

RF received power data at said antenna from a received RF signal;

determining a location of an RF received peak power level;

rotating said horn to point to said location of RF received peak power level; and tracking the position of a target located at said location of RF received peak power level, performing a second search by rotating said horn in azimuth at a slower speed than said first speed to collect the RF received power data, performing a third search by rotating said horn in azimuth in an opposite direction and at a slower speed than said first speed to collect the RF received power data, wherein said first search is a linear search, said second search is a sinusoidal search and said third search is a series of reversing linear searches.

* * * * *